United States Patent
Kawada et al.

(10) Patent No.: US 11,320,569 B2
(45) Date of Patent: May 3, 2022

(54) OPTICAL ELEMENT FOR TERAHERTZ WAVES AND MANUFACTURING METHOD OF THE SAME

(71) Applicants: HAMAMATSU PHOTONICS K.K., Hamamatsu (JP); Teijin Limited, Osaka (JP)

(72) Inventors: Yoichi Kawada, Hamamatsu (JP); Hironori Takahashi, Hamamatsu (JP); Yoshinori Ikeda, Osaka (JP); Junshi Soeda, Osaka (JP)

(73) Assignees: HAMAMATSU PHOTONICS K.K., Hamamatsu (JP); Teijin Limited, Osaka (JP)

( * ) Notice: Subject to any disclaimer, the term of this patent is extended or adjusted under 35 U.S.C. 154(b) by 121 days.

(21) Appl. No.: 16/581,885

(22) Filed: Sep. 25, 2019

(65) Prior Publication Data
US 2020/0103557 A1  Apr. 2, 2020

(30) Foreign Application Priority Data

Sep. 28, 2018 (JP) .............................. JP2018-184258
Mar. 27, 2019 (JP) .............................. JP2019-060789

(51) Int. Cl.
*G02B 1/111* (2015.01)
(52) U.S. Cl.
CPC .................................. *G02B 1/111* (2013.01)
(58) Field of Classification Search
CPC ...... G02B 1/00–1/18; C09J 123/00–123/0838; C09J 123/10–123/24
See application file for complete search history.

(56) References Cited

U.S. PATENT DOCUMENTS 3,784,587 A * 1/1974 Chambers ........... C08L 2666/02
427/208.4
4,133,789 A * 1/1979 Lakshmanan .......... C09J 123/08
156/322

(Continued)

FOREIGN PATENT DOCUMENTS

CN         1502048 A     6/2004
CN       102712832 A    10/2012
(Continued)

OTHER PUBLICATIONS

Wang et al. "The preparation of refractive index tunable composites and its antireflective application in terahertz frequency range," 2015 Opto-Electronics and Communications Conference (OECC), 2015; pp. 1-3.*

(Continued)

*Primary Examiner* — Prashant J Khatri
(74) *Attorney, Agent, or Firm* — Faegre Drinker Biddle & Reath LLP (57) ABSTRACT

An optical element for terahertz waves includes: an optical component including a silicon surface, an antireflection film including an organic resin including a cycloolefin-based polymer as a main component, and inorganic particles dispersed in the organic resin; and an adhesive layer located between the optical component and the antireflection film in a thickness direction of the antireflection film and bonding the silicon surface of the optical component and the antireflection film to each other. The adhesive layer includes a thermally denatured olefin-based polymer.

17 Claims, 7 Drawing Sheets (56) References Cited

U.S. PATENT DOCUMENTS

2008/0239486 A1    10/2008  Kato et al.
2011/0110213 A1*    5/2011  Arai ................... B29C 65/1658
                                                             369/100

FOREIGN PATENT DOCUMENTS

| CN | 104813199 A | 7/2015 |
| CN | 105281043 A | 1/2016 |
| JP | WO2012/005220 | 1/2012 |
| JP | 5652516 B1 | 1/2015 |
| WO | WO-2012/005220 A1 | 1/2012 |

OTHER PUBLICATIONS

Jia et al. "Preparation and properties of five-layer graded-refractive-index antireflection coating nanostructured by solid and hollow silica particles", Thin Solid Films 642 (2017); pp. 174-181.*
G. Xu et al., "0.1-20 THz ultra-broadband perfect absorber via a flat multi-layer structure," Optics Express, vol. 24, No. 20, Oct. 3, 2016, pp. 23177-23185.
Y. W. Chen et al., "Tunable boradband antireflection structures for silicon at terahertz frequency," Applied Physics Letters, 94 041106 (2009), pp. 1-3.
B. Cai et al., "Ultra-Broadband THz Antireflective Coating with Polymer Composites," Polymers, 2017, 9, 574, pp. 1-9.

* cited by examiner

OPTICAL ELEMENT FOR TERAHERTZ WAVES AND MANUFACTURING METHOD OF THE SAME

CROSS REFERENCE TO RELATED APPLICATION

This application claims the priority benefit of Japanese Applications No. JP2018-184258 filed on Sep. 28, 2018 and JP2019-060789 filed on Mar. 27, 2019, the entire contents of which are incorporated herein by references.

TECHNICAL FIELD

The present disclosure relates to an optical element for terahertz waves and a manufacturing method of the same.

BACKGROUND

In recent years, optical elements (for example, lenses or polarizers) usable in a terahertz band have been developed, in order to realize non-destructive and non-contact inspection technologies using electromagnetic waves in the terahertz band (terahertz waves). In a non-patent literature, Gongjie Xu, et al., "0.1-20 THz ultra-broadband perfect absorber via a flat multi-layer structure," Optics Express 24, 23177 (2016), a terahertz-wave perfect absorber (absorber) has been disclosed. The non-patent literature discloses an aspect in which an antireflection film having a refractive index adjusted by titanium oxide fine particles or hollow polystyrene microspheres is provided on a highly doped silicon substrate. From a viewpoint of adhering the antireflection film to the silicon substrate well, an epoxy-based polymer is used as a main component of the antireflection film.

The epoxy-based polymer shows properties of absorbing terahertz waves. Accordingly, in a case where the antireflection film disclosed in the non-patent literature is applied to an optical element which should transmit terahertz waves, problems may occur.

SUMMARY

According to an aspect of the present disclosure, there is provided an optical element for terahertz waves, including: an optical component including a silicon surface; an antireflection film including an organic resin including a cycloolefin-based polymer as a main component, and inorganic particles dispersed in the organic resin; and an adhesive layer which is located between the optical component and the antireflection film in a thickness direction of the antireflection film and bonds the silicon surface of the optical component and the antireflection film to each other, in which the adhesive layer includes a thermally denatured olefin-based polymer.

According to this optical element for terahertz waves, the organic resin included in the antireflection film includes the cycloolefin-based polymer as a main component. This antireflection film shows more excellent transmittance with respect to the terahertz waves, than in a case of using an organic resin including an epoxy-based polymer as a main component. Meanwhile, adhesiveness of the cycloolefin-based polymer with respect to silicon tends to be poorer, than that of the epoxy-based polymer. Accordingly, in a case where the antireflection film including the organic resin including the cycloolefin-based polymer as a main component is simply formed on the silicon surface, the antireflection film may not be formed well. With respect to this, according to the optical element for terahertz waves, the antireflection film and the silicon surface of the optical component are bonded to each other through the adhesive layer including the thermally denatured olefin-based polymer. The thermally denatured olefin-based polymer has improved adhesiveness with respect to silicon, while maintaining transmittance with respect to terahertz waves. By using the adhesive layer including such thermally denatured olefin-based polymer, it is possible to fix the antireflection film onto the silicon surface well, while preventing absorption of terahertz waves due to the adhesive layer. Therefore, it is possible to provide the optical element for terahertz waves including the antireflection film showing excellent transmittance with respect to terahertz waves, with excellent reliability.

A ratio of a volume of the inorganic particles per unit volume of the antireflection film may become higher, the closer it is to the optical component in the thickness direction. In this case, a refractive index of the antireflection film can be further approximated to that of silicon at portions closer to the optical component in a thickness direction. Accordingly, it is possible to prevent reflection of terahertz waves on the silicon surface.

The antireflection film may include a plurality of layers stacked each other in the thickness direction, each of the plurality of layers may include the organic resin including the cycloolefin-based polymer as a main component, and the inorganic particles dispersed in the organic resin, and a ratio of a volume of the inorganic particles per unit volume may become higher at the layers closer to the optical component in the thickness direction. In this case, a refractive index of the antireflection film can be further approximated to that of silicon at portions closer to the optical component in the thickness direction, and accordingly, it is possible to prevent reflection of terahertz waves on the silicon surface. In addition, it is possible to easily, reliably, and gradually change the refractive index of the antireflection film in a thickness direction.

The antireflection film may include a first surface facing the optical component in the thickness direction and a second surface located opposite to the first surface, and the optical element for terahertz waves may further include a bubble-containing layer located on the second surface and including a plurality of bubbles. In this case, it is possible to prevent the reflection of terahertz waves on the second surface of the antireflection film by the bubble-containing layer well. In addition, a surface of the bubble-containing layer may have an uneven shape. In this case, it is possible to prevent the reflection of terahertz waves on the surface of the bubble-containing layer well.

The antireflection film may include a first surface facing the optical component in the thickness direction and a second surface located opposite to the first surface, and the second surface may have an uneven shape. In this case, it is possible to prevent the reflection of terahertz waves on the second surface of the antireflection film.

A thickness of the adhesive layer may be 1 nm to 100 km. In this case, it is possible to fix the antireflection film onto the silicon surface through the adhesive layer well and prevent the absorption of terahertz waves due to the adhesive layer well.

The inorganic particles may include at least one of silicon particles, titanium oxide particles and diamond particles. In this case, it is possible to adjust a refractive index of the antireflection film by the inorganic particles, while preventing the absorption of terahertz waves due to the antireflection film.

According to another aspect of the present disclosure, there is provided a manufacturing method of an optical element for terahertz waves, the method including: preparing an optical component including a silicon surface; forming an adhesive layer including an olefin-based polymer on the silicon surface of the optical component; adhering the adhesive layer to the silicon surface by thermally denaturing the olefin-based polymer included in the adhesive layer by heating; and bonding an antireflection film through the adhesive layer including the thermally denatured olefin-based polymer. The antireflection film includes an organic resin including a cycloolefin-based polymer as a main component, and inorganic particles dispersed in the organic resin to the optical component.

The cycloolefin-based polymer shows more excellent transmittance with respect to the terahertz waves, than that of the epoxy-based polymer, whereas adhesiveness to silicon tends to be poor. Accordingly, in a case where the antireflection film including the organic resin including the cycloolefin-based polymer as a main component is simply formed on the silicon surface, the antireflection film may not be formed well. With respect to this, according to the manufacturing method, the adhesive layer including the olefin-based polymer thermally denatured by heating is stuck to the silicon surface of the optical component, and then, the antireflection film is bonded to the optical component through the adhesive layer. The thermally denatured olefin-based polymer has improved adhesiveness with respect to silicon, while maintaining transmittance with respect to terahertz waves. By using the adhesive layer including such thermally denatured olefin-based polymer, it is possible to fix the antireflection film onto the silicon surface well, while preventing absorption of terahertz waves due to the adhesive layer. Therefore, it is possible to manufacture the optical element for terahertz waves including the antireflection film showing excellent transmittance with respect to terahertz waves, with excellent reliability.

BRIEF DESCRIPTION OF THE DRAWINGS

The foregoing and other purposes, aspects and advantages will be better understood from the following detailed description of a preferred embodiment of the disclosure with reference to the drawings, in which.

DETAILED DESCRIPTION

Hereinafter, preferred embodiments of the aspect of the present disclosure will be described in detail, with reference to the accompanying drawings. In the following description, the same reference numerals are used for the same elements or elements having the same functions, and the overlapped description will be omitted.

Figure 1:
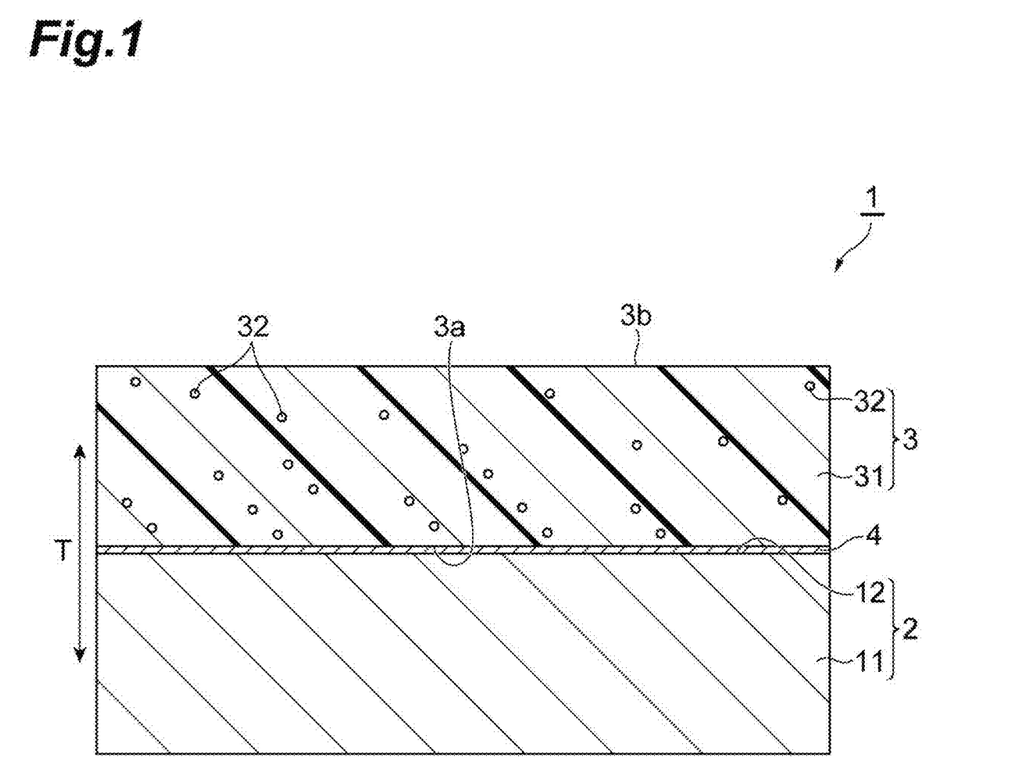
FIG. 1 shows a schematic cross section view of an optical element according to an embodiment.

FIG. 1 shows a schematic cross section view of an optical element according to an embodiment. An optical element 1 shown in FIG. 1 is an element usable in electromagnetic waves in a terahertz band (hereinafter, simply referred to as terahertz waves) (optical element for terahertz waves). The optical element 1 is, for example, a lens, a polarizer, a spectroscope, an absorber, and various sensors. The optical element 1 includes an optical component 2, an antireflection film 3 located on the optical component 2, and an adhesive layer 4 located between the optical component 2 and the antireflection film 3 in a thickness direction T of the antireflection film 3. The terahertz waves of the present embodiment are, for example, electromagnetic waves or light at frequency of 0.1 THz to 10 THz.

The optical component 2 is a component which receives terahertz waves transmitted through the antireflection film 3, and includes a main body portion 11, and a main surface 12 located on a side of the antireflection film 3 in the thickness direction T. The main body portion 11 may be a member which transmits terahertz waves and may be a member which converts terahertz waves into an electric signal. In a case where the optical component 2 is a sensor with which the terahertz waves are sensed, for example, a sensor portion which receives terahertz waves, an amplifier circuit which amplifies an electric signal output from the sensor portion, various wirings, and the like can be provided in the main body portion 11. A terminal or the like for connecting the sensor portion or the like and an external device to each other may be provided in the main body portion 11. The main surface 12 is an incidence surface of terahertz waves on the optical component 2. In a case where the sensor portion and the like are provided in the main body portion 11, a part of the main surface 12 may be constituted by, for example, the sensor portion and various wirings.

In the present embodiment, the main body portion 11 is a member which transmits terahertz waves. Specifically, the main body portion 11 is a monocrystal silicon substrate showing excellent transmittance with respect to terahertz waves, and the main surface 12 is one surface (silicon surface) of the silicon substrate. Impurities may be doped on at least a part of the silicon substrate. The silicon surface is, for example, a surface of at least a part of the main surface 12 constituted by silicon. Accordingly, the silicon surface of the present embodiment is not only formed with silicon, and may include a metal surface functioning as a part of wirings, a compound semiconductor surface, a carbon material surface, a metal oxide surface, and a metal nitride surface.

The antireflection film 3 is a monolayer film which inhibits and/or prevents the reflection of terahertz waves on the surface of the optical component 2. The antireflection film 3 includes a first surface 3a facing the optical component 2 in the thickness direction T and a second surface 3b located opposite to the first surface 3a. In the present embodiment, the second surface 3b corresponds to an outermost surface of the optical element 1. A thickness of the antireflection film 3 is, for example, 4 μm to 400 μm. In the present embodiment, the refractive index of the antireflection film 3 is equal to or greater than the refractive index of the air (equal to or greater than 1) and equal to or smaller than the refractive index of silicon (approximately equal to or smaller than 3.4). The antireflection film 3 includes an organic resin 31 having a layered shape and inorganic particles 32 included in the organic resin 31. A ratio of the organic resin 31 and the inorganic particles 32 in the antireflection film 3 is not particularly limited. For example, a ratio of a volume of the organic resin 31 per unit volume of the antireflection film 3 may be higher or lower than that of a volume of the inorganic particles 32 per the unit volume.

The organic resin 31 is a resin constituted by only a cycloolefin-based polymer or a resin including a cycloolefin-based polymer as a main component. In the present embodiment, the organic resin 31 is a resin including a cycloolefin-based polymer as a main component, and can include a polymer organic compound other than the cycloolefin-based polymer, a low-molecular organic compound and the like. For example, the organic resin 31 may include a cross-linking agent, a polymerization initiator, and the like. The organic resin 31 may include inorganic substances other than the inorganic particles 32. The "main component of the organic resin 31" of the present embodiment corresponds to a substance having the largest content in the organic resin 31. For example, a substance occupying 50 mass % or more, 60 mass % or more, or 70 mass % or more in the organic resin 31 may correspond to the main component of the organic resin 31.

The cycloolefin-based polymer may be a polymer including a cycloolefin portion in a main chain and is a substance showing transmittance with respect to terahertz waves. In the present embodiment, the substance showing transmittance with respect to terahertz waves corresponds to a substance showing lower absorbing performance of terahertz waves than that of an epoxy-based polymer (for example, 3,4-epoxycyclohexylmethyl-3,4-epoxycyclohexanecarboxylate or the like). Alternatively, the substance showing transmittance with respect to terahertz waves may be a substance showing the absorbing performance of terahertz waves that is 10% or less of that of 3,4-epoxycyclohexylmethyl-3,4-epoxycyclohexanecarboxylate.

Examples of the cycloolefin-based polymer include a ring-opening polymer of a cycloolefin monomer, an additive polymer of a cycloolefin monomer, and a copolymer of a cycloolefin monomer and a chain-like olefin. The cycloolefin-based polymer is, for example, various polystyrenes. The cycloolefin monomer is a compound having a cyclic structure formed with carbon atoms and having a carbon-carbon double bond in the cyclic structure. Examples of the cycloolefin monomer include norbornene monomers which are monomers including Norbornene rings such as a bicyclic body like 2-norbornene or norbornadiene, a tricyclic body such as dicyclopentadiene or dihydrodicyclopentadiene, a tetracyclic body such as tetracyclododecene, ethylidene tetracyclododecene, or phenyltetracyclododecene, a pentacyclic body such as tricyclopentadiene, and a heptacyclic body such as tetracyclopentadiene. The cycloolefin monomer may be a monocyclic cycloolefin such as cyclobutene, cyclopentene, cyclooctene, cyclododecene, or 1,5-cyclooctadiene. The cycloolefin monomer may include a substituent in a range not inhibiting an operation effect of the organic resin 31. The substituent includes, for example, oxygen or nitrogen.

The cycloolefin-based polymer may be, for example, ZEONEX (registered trademark)•SERIES or ZEONOR (registered trademark)•SERIES manufactured by ZEON Corporation, may be SUMILITE (registered trademark) •SERIES manufactured by Sumitomo Bakelite Co., Ltd., may be ARTON (registered trademark)•SERIES manufactured by JSR Corporation, may be APEL (registered trademark)•SERIES manufactured by Mitsui Chemicals, Inc., may be TOPAS (registered trademark)•SERIES manufactured by Ticona, or may be OPTOREZ SERIES manufactured by Hitachi Chemical Company, Ltd.

The inorganic particles 32 are used for adjusting the refractive index of the antireflection film 3 and dispersed in the organic resin 31. The inorganic particles 32 includes, for example, a substance showing transmittance with respect to terahertz waves and showing a refractive index higher than that of the organic resin 31. The inorganic particles 32 are, for example, silicon particles, titanium oxide particles, or diamond particles. The silicon particles may be a high-resistance silicon particles. The high-resistance silicon particles are, for example, silicon particles having a resistance equal to or greater than $1\times10^3$ $\Omega\cdot$cm. An average diameter of the inorganic particles 32 is, for example, 5 nm to 3000 nm. The upper limit of the average diameter of the inorganic particles 32 may be 200 nm or 20 nm. The lower limit of the average diameter of the inorganic particles 32 may be 200 nm or 20 nm. The average diameter of the inorganic particles 32 is measured by, for example, a laser diffraction•scattering method, a dynamic light scattering method, or a photon correlation method.

The refractive index of the antireflection film 3 can be controlled, by adjusting a concentration of the inorganic particles 32 dispersed in the organic resin 31. In the antireflection film 3, the inorganic particles 32 may be dispersed uniformly or may be dispersed un-uniformly. In the present embodiment, the inorganic particles 32 are un-uniformly dispersed in the antireflection film 3. Specifically, a ratio of a volume of the inorganic particles 32 per the unit volume of the antireflection film 3 is higher, the closer the optical component 2 is in the thickness direction T. Accordingly, in a portion close to the optical component 2 in the thickness direction T, a content of the inorganic particles 32 in the unit volume of the antireflection film 3 increases. The percentage of the volume of the inorganic particles 32 per the unit volume of the antireflection film 3 is, for example, greater than 0%, equal to or smaller than 50%, equal to or smaller than 60%, or equal to or smaller than 70%. The refractive index of the antireflection film 3 increases, in a portion close to the optical component 2 in the thickness direction T. In the present embodiment, the refractive index of the antireflection film 3 is further approximated to the refractive index of silicon at portions closer to the optical component 2 in the thickness direction T. The refractive index of the antireflection film 3 may be continuously changed or changed in a step-by-step manner in the thickness direction T. From a viewpoint of inhibiting the reflection of terahertz waves in the antireflection film 3, the refractive index of the antireflection film 3 may be continuously changed in the thickness direction T. For example, it is possible to realize an un-uniformly distributed state (uneven dispersed state) of the inorganic particles 32 in the antireflection film 3, by leaving the organic resin 31, in which the inorganic particles 32 are dispersed, still without causing curing.

The refractive index of the antireflection film 3 is derived by effective medium approximation, for example. For example, a dielectric constant of a predetermined portion of the antireflection film 3 is set as $\varepsilon_{layer}$, a dielectric constant of the inorganic particles 32 is set as $\varepsilon_a$, a dielectric constant of the organic resin 31 is set as $\varepsilon_b$, and a ratio of a volume (volume fraction) of the inorganic particles 32 per the volume of the predetermined portion is set as $f_a$. In this case, a relationship represented by [Formula 1] shown below is satisfied. In a case where the refractive index is set as n and the dielectric constant is set as E, a relationship of $n^2=\varepsilon$ is satisfied. Accordingly, it is possible to derive the refractive index of the predetermined portion of the antireflection film 3 by obtaining $\varepsilon_{layer}$ using the following equation. The effective medium approximation is a method of replacing and analyzing a roughness of a film surface and an interface or heterogeneity and discontinuity with an effective homogeneous film, and obtaining an optical constant of the effective homogeneous film.

$$f_a \frac{\varepsilon_a - \varepsilon_{layer}}{\varepsilon_a + 2\varepsilon_{layer}} + (1 - f_a) \frac{\varepsilon_b - \varepsilon_{layer}}{\varepsilon_b + 2\varepsilon_{layer}} = 0 \qquad \text{[Formula 1]}$$

The adhesive layer 4 is a layer for bonding the main surface 12 of the optical component 2 and the antireflection film 3 to each other. The adhesive layer 4 shows adhesiveness with respect to both of a cycloolefin-based polymer and silicon. A thickness of the adhesive layer 4 is, for example, 1 nm to 100 µm. The thickness of the adhesive layer 4 may be equal to or thicker than 5 nm or equal to or thicker than 10 nm. The thickness of the adhesive layer 4 may be equal to or thinner than 30 µm, equal to or thinner than 10 µm, equal to or thinner than 1000 nm, equal to or thinner than 500 nm, or equal to or thinner than 100 nm. By setting the thickness of the adhesive layer 4 to be equal to or thicker than 1 nm, the antireflection film 3 can be fixed onto the main surface 12 well. By setting the thickness of the adhesive layer 4 to be equal to or thinner than 100 µm, the absorption of terahertz waves by the adhesive layer 4 can be prevented well. The adhesive layer 4 includes an olefin-based polymer thermally denatured on the main surface 12 of the optical component 2.

The olefin-based polymer is a polymer obtained by polymerizing a monomer including olefin as a main component. For example, a polymer, which is obtained by polymerizing a monomer including 50 mass % or more, 60 mass % or more, 70 mass % or more, 80 mass % or more, 90 mass % or more, or 95 mass % or more, of an olefin-derived monomer portion corresponds to the olefin-based polymer. Examples of the olefin-based polymer include polyethylene, polypropylene, polybutene, and polymethylpentene. Accordingly, as the adhesive layer 4, a polyethylene film, polypropylene film, or the like may be used. The olefin-based polymer may be a copolymer. For example, a copolymer of α-olefin and ethylene or propylene such as a propylene-ethylene copolymer or propylene-butene copolymer, a styrene-butadiene-styrene block copolymer, a styrene-hexadiene-styrene copolymer, styrene-pentadiene-styrene copolymer, or an ethylene-propylene-diene copolymer (RPDM) may be the olefin-based polymer. The olefin-based polymer may be a cycloolefin-based polymer. In this case, the cycloolefin-based polymer may be selected from polymers used in the organic resin 31. The olefin-based polymer may be a mixture of a plurality of polymers. From a viewpoint of adhesiveness between the adhesive layer 4 including the thermally denatured olefin-based polymer and the antireflection film 3, the polymer included in the adhesive layer 4, and the polymer which is included in the antireflection film 3 and not thermally denatured may be the same polymer.

The thermally denatured olefin-based polymer is an olefin-based polymer thermally denatured by heating, and shows more adhesiveness with respect to silicon, than an olefin-based polymer before the thermal denaturing by the heating. It is assumed that this is because a functional group (for example, a hydrophilic group such as a hydroxyl group) on the silicon surface and the thermally denatured olefin-based polymer are bonded to each other. That is, it is assumed that the bonding strengthens adhesiveness between the silicon and the thermally denatured olefin-based polymer. At least one of a chemical structure, a number average molecular weight, and a weight average molecular weight of the thermally denatured olefin-based polymer may be different from that of the olefin-based polymer before the thermal denaturing by the heating.

A heating temperature for the thermal denaturing of the olefin-based polymer is, for example, equal to or higher than 160° C., equal to or higher than 180° C., equal to or higher than 200° C., or equal to or higher than 240° C. The heating temperature is, for example, equal to or lower than 500° C., equal to or lower than 400° C., equal to or lower than 360° C., equal to or lower than 320° C., or equal to or lower than 280° C. In a case where the heating temperature is excessively low, the bonding may not be sufficiently formed. On the other hand, in a case where the heating temperature is excessively high, the olefin-based polymer may be thermally decomposed. From a viewpoint of reliably preventing such problems, the heating temperature may be, for example, 200° C. to 360° C. or may be 240° C. to 320° C. The heating is performed in an oxygen-containing atmosphere such as in air atmosphere, for example. The heating is performed by using a heating source such as an oven, a hot plate, an infrared ray, a flame, a laser, or a flash lamp. A period of time necessary for heating for the thermal denaturing of the olefin-based polymer is not particularly limited, and is, for example, 1 minute to 10 minutes. The period of time may be 2 minutes.

A degree of the thermal denaturing of the olefin-based polymer included in the adhesive layer 4 can be adjusted by the heating temperature, an oxygen concentration during the heating, or the like. For example, in order to increase the degree of the thermal denaturing of the olefin-based polymer, the heating temperature of the adhesive layer 4 is increased and/or the oxygen concentration during the heating is increased. On the other hand, in order to decrease the degree of the thermal denaturing of the olefin-based polymer, the heating temperature of the adhesive layer 4 is decreased and/or the oxygen concentration during the heating is decreased.

The degree of the thermal denaturing of the olefin-based polymer included in the adhesive layer 4 can be evaluated, for example, by using an oxygen content of the thermally denatured olefin-based polymer constituting the adhesive layer 4. As a specific example, by deriving a percentage of the number of oxygen atoms included in the adhesive layer 4 with respect to a total of the number of oxygen atoms and the number of carbon atoms included in the adhesive layer 4 (number of oxygen atoms/(number of oxygen atoms+number of carbon atoms)×100(%)), the degree of the thermal denaturing of the olefin-based polymer included in the adhesive layer 4 can be evaluated. According to this evaluation, it is assumed that the higher percentage is, the greater degree of the thermal denaturing of the olefin-based polymer is. For example, in a case where the percentage is equal to or higher than 0.3%, equal to or higher than 0.5%, equal to or higher than 1.0%, equal to or higher than 2.0%, or equal to or higher than 5.0%, and equal to or lower than 50%, equal to or lower than 30%, equal to or lower than 20%, equal to or lower than 10%, or equal to or lower than 8%, the percentage is suitably used as an index showing the degree of the thermal denaturing of the olefin-based polymer. As a method of evaluating the content of the oxygen atoms and the carbon atoms in the adhesive layer 4, X-ray photoelectron spectroscopy (XPS) is used, for example. As an XPS device, for example, "K-Alpha (Thermo Fisher Scientific K.K.)" is used.

The degree of the thermal denaturing of the olefin-based polymer included in the adhesive layer 4 can also be evaluated, for example, by infrared absorption spectrum of the thermally denatured olefin-based polymer constituting the adhesive layer 4. As a specific example, by deriving a ratio of an integrated value of an absorption peak of C=O stretching vibration of the adhesive layer 4 with respect to an integrated value of an absorption peak of C—H stretching vibration of the adhesive layer 4 (integrated value of absorption peak of C=O stretching vibration/integrated value of absorption peak of C—H stretching vibration (dimensionless number)), the degree of the thermal denaturing of the olefin-based polymer included in the adhesive layer 4 can be evaluated. According to this evaluation, it is assumed that the higher the ratio is, the greater degree of the thermal denaturing of the olefin-based polymer is. For example, in a case where the ratio thereof is equal to or greater than 0.01, equal to or greater than 0.02, equal to or greater than 0.05, equal to or greater than 0.1, equal to or greater than 0.15, or equal to or greater than 0.20 and equal to or smaller than 20, equal to or smaller than 10, or equal to or smaller than 5, the ratio is suitably used particularly as an index showing the degree of the thermal denaturing of the olefin-based polymer. The infrared absorption spectrum of the adhesive layer 4 is measured by using "Nicolet 6700 (Thermo Fisher Scientific K.K.)" which is a Fourier transform infrared spectrophotometer, for example.

Figure 2:
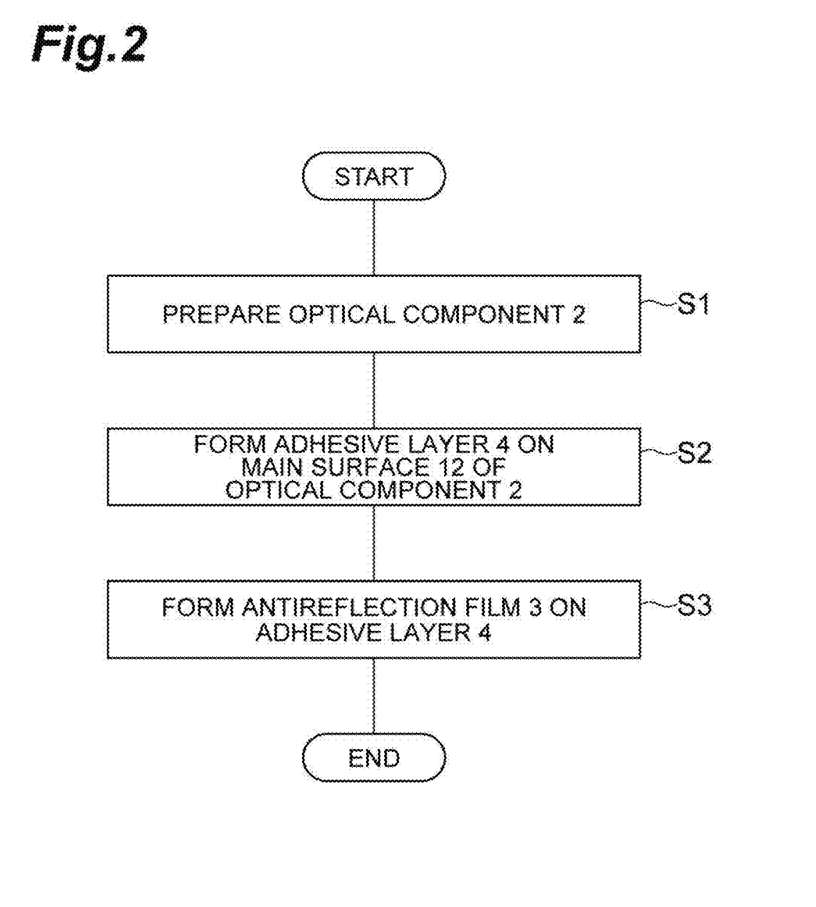
FIG. 2 is a flowchart for describing a manufacturing method of an optical element according to the embodiment.

Next, an example of a manufacturing method of the optical element 1 according to the present embodiment will be described with reference to FIG. 2. FIG. 2 is a flowchart for describing the manufacturing method of the optical element according to the present embodiment.

First, the optical component 2 including the main surface 12 is prepared (Step S1). In Step S1, for example, the optical component 2 constituted by a processed or unprocessed silicon substrate is prepared. In order to increase the number of hydrophilic groups such as a hydroxyl group on the main surface 12, the main surface 12 may be subjected to a surface treatment such as an ozone treatment or an ultraviolet light treatment.

Next, the adhesive layer 4 including the thermally denatured olefin-based polymer is formed on the main surface 12 of the optical component 2 (Step S2). In Step S2, for example, first, the adhesive layer 4 including the olefin-based polymer is formed on the main surface 12. Then, the adhesive layer 4 is formed by thermally denaturing the olefin-based polymer included in the adhesive layer 4 by heating. For example, by mounting the optical component 2 provided with the adhesive layer 4 on a hot plate heated at a predetermined temperature, the olefin-based polymer is thermally denatured. Accordingly, the adhesive layer 4 stuck to the main surface 12 well is formed.

The adhesive layer 4 including the olefin-based polymer before the thermal denaturing is formed, for example, by various coating methods. In a case of performing the coating method, first, a solution obtained by dissolving an olefin-based polymer in a solvent (for example, toluene or chloroform) is prepared. Then, the solution is coated over the main surface 12. Next, the coated solution is dried. During the drying, conditions of a temperature, a heating time, a pressure, and an atmosphere for removing the solvent are suitably set. For example, by mounting the optical component 2 on a hot plate heated at a predetermined temperature under an air atmosphere and ordinary pressure, the solution is dried. As a specific example, the optical component 2 is mounted on the hot plate heated to a temperature equal to or lower than 140° C. for a predetermined period of time. The predetermined period of time is not particularly limited, and the maximum period of time is for example, 10 minutes. Examples of the coating method include a spin coating method, a roll coater method, a spray coating method, a die coater method, an applicator method, an immersion coating method, a brush coating method, a spatula coating method, a roller coating method, and a curtain flow coater method.

The adhesive layer 4 including the olefin-based polymer before the thermal denaturing may be formed by a thermocompression bonding method (for example, a heat press method, a welding method, or a powder coating method). In a case of performing the heat press method, for example, a target such as a bulk solid, a powder, or a film is placed on the main surface 12 of the optical component 2, then, the target is heated and the pressure is applied to the target. Accordingly, the target is melted or welded on the main surface 12.

Next, by forming the antireflection film 3 on the adhesive layer 4, the antireflection film 3 is bonded to the main surface 12 of the optical component 2 through the adhesive layer 4 (Step S3). In Step S3, for example, the antireflection film 3 is formed on the adhesive layer 4 by the coating method or the heat press method. For example, in a case of using the coating method, first, a solution including the inorganic particles 32 and the organic resin 31 is applied on the adhesive layer 4. The solution is dried by using a heating source such as a hot plate. Accordingly, the antireflection film 3 including the organic resin 31 in which the inorganic particles 32 are dispersed, is formed. For example, in a case of using the heat press method, the antireflection film 3 formed in advance is bonded to the adhesive layer 4.

According to the optical element 1 for terahertz waves formed by the manufacturing method according to the predetermined embodiment described above, the antireflection film 3 includes the organic resin 31 including the cycloolefin-based polymer showing more excellent transmittance with respect to terahertz waves than that of the epoxy-based polymer, as a main component. The antireflection film 3 shows better transmittance with respect to terahertz waves compared to when the organic resin including the epoxy-based polymer as a main component is used. Meanwhile, the adhesiveness of the cycloolefin-based polymer with respect to silicon tends to be deteriorated than that of the epoxy-based polymer. Accordingly, in a case where the antireflection film 3 including the organic resin 31 including the cycloolefin-based polymer as a main component is simply formed on the silicon surface, the antireflection film 3 may not be formed well. With respect to this, according to the optical element 1 of the present embodiment, the antireflection film 3 and the main surface 12 which is the silicon surface of the optical component 2 are bonded to each other through the adhesive layer 4 including the thermally denatured olefin-based polymer. The thermally denatured olefin-based polymer has improved adhesiveness with respect to silicon, while maintaining transmittance with respect to terahertz waves. By using the adhesive layer 4 including such thermally denatured olefin-based polymer, it is possible to fix the antireflection film 3 onto the silicon surface well, while preventing absorption of terahertz waves due to the adhesive layer 4. Therefore, according to the present embodiment, it is possible to manufacture the optical element 1 including the antireflection film 3 showing excellent transmittance with respect to terahertz waves, with excellent reliability.

In the present embodiment, the ratio of the volume of the inorganic particles 32 per the unit volume of the antireflection film 3 is higher, the closer the optical component 2 is in the thickness direction T. Accordingly, the refractive index of the antireflection film 3 can be set higher at portions closer to the optical component 2 in the thickness direction T. Therefore, the reflection of terahertz waves on the main surface 12 can be prevented well.

In the present embodiment, the thickness of the adhesive layer 4 is 1 nm to 100 μm. Accordingly, it is possible to fix the antireflection film 3 onto the main surface 12 through the adhesive layer 4 and prevent the absorption of terahertz waves due to the adhesive layer 4 well.

In the present embodiment, the inorganic particles 32 may include at least one of silicon particles, titanium oxide particles, and diamond particles. In this case, it is possible to adjust a refractive index of the antireflection film 3 by the inorganic particles 32, while preventing the absorption of terahertz waves due to the antireflection film 3.

Next, each modification example of the present embodiment will be described with reference to FIGS. 3 to 7. In the description of each modification example, the overlapped description as the present embodiment is omitted and the different part from the present embodiment is described. That is, the description of the present embodiment may be suitably used in each modification example in a technically available range.

First Modification Example

Figure 3:
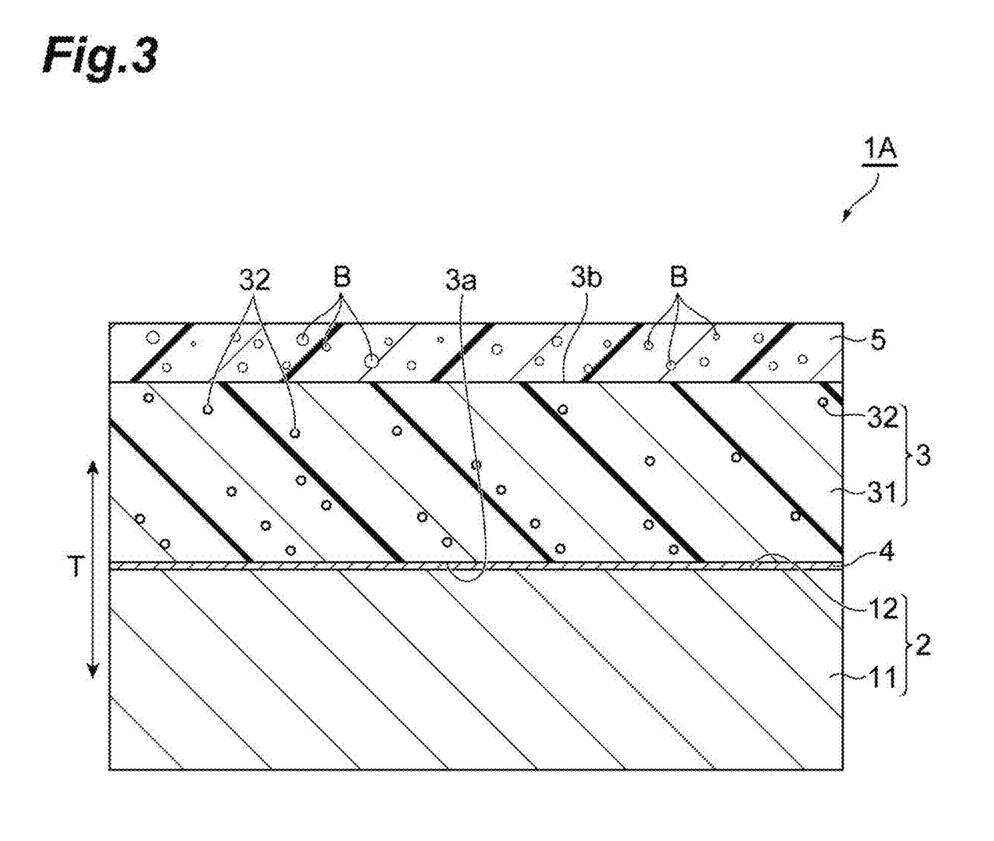
FIG. 3 shows a schematic cross section view of an optical element according to a first modification example.

FIG. 3 shows a schematic cross section view of an optical element according to a first modification example. An optical element 1A shown in FIG. 3 includes a bubble-containing layer 5 which is located on a second surface 3b of the antireflection film 3 and includes a plurality of bubbles B, in addition to the optical component 2, the antireflection film 3, and the adhesive layer 4. The bubble-containing layer 5 is a layer-shaped organic resin including a cycloolefin-based polymer as a main component, in the same manner as the antireflection film 3, and holes due to the bubbles B are provided. A porosity of the bubble-containing layer 5 is, for example, greater than 0% and smaller than 100%. Some bubbles B in the bubble-containing layer 5 may be integrated. A refractive index of the bubble-containing layer 5 is equal to or greater than a refractive index of the air (equal to or greater than 1) and is equal to or smaller than the refractive index of the antireflection film 3. The bubbles B are air bubbles dispersed in the bubble-containing layer 5. An average diameter of the bubbles B is, for example, set to be 100 nm to 3000 nm, and accordingly, the bubbles B of the first modification example can be referred to as so-called nano-bubbles. The bubbles B are, for example, formed by blowing air to the organic resin. In the bubble-containing layer 5, the bubbles B may be uniformly dispersed or un-uniformly dispersed. The bubble-containing layer 5 may include particles corresponding to the inorganic particles 32. In a case where the bubble-containing layer 5 includes the particles, a ratio of a volume of the inorganic particles occupying the volume of the bubble-containing layer 5 is lower than the ratio of the volume of the inorganic particles 32 occupying the unit volume of the antireflection film 3.

In the first modification example described above, the same operation effect as that in the present embodiment is also exhibited. In addition, since the bubbles B are air bubbles, the bubbles B can be assumed as nano-particles showing the same refractive index as that of the air. Accordingly, the refractive index of the bubble-containing layer 5 can be easily decreased than the refractive index of the second surface 3b of the antireflection film 3. Therefore, in the first modification example, when the optical element 1A includes the bubble-containing layer 5, it is possible to prevent the reflection of terahertz waves on the second surface 3b of the antireflection film 3 well.

In the first modification example, the bubbles B may be un-uniformly dispersed in the bubble-containing layer 5. Specifically, a ratio of a volume of the bubbles B per a unit volume of the bubble-containing layer 5 is lower, the closer the second surface 3b is in the thickness direction T. Accordingly, the farther the bubble-containing layer 5 is from the second substrate 3b in the thickness direction T, the smaller refractive index of the bubble-containing layer 5 is. Therefore, it is possible to make the refractive index of the surface of the bubble-containing layer 5 close to an effective refractive index of the air and to prevent the reflection of terahertz waves on the surface of the bubble-containing layer 5 well. The refractive index of the bubble-containing layer 5 may be continuously changed or changed in a step-by-step manner in the thickness direction T. From a viewpoint of inhibiting the reflection of terahertz waves in the bubble-containing layer 5, the refractive index of the bubble-containing layer 5 may be continuously changed in the thickness direction T. In a case where the refractive index of the bubble-containing layer 5 is changed in a step-by-step manner, the bubble-containing layer 5 may include a plurality of layers stacked each other in the thickness direction T. In this case, the ratio of the volume of the bubbles B per unit volume is lower at layers closer to the antireflection film 3 in the thickness direction T.

Second Modification Example

Figure 4A:
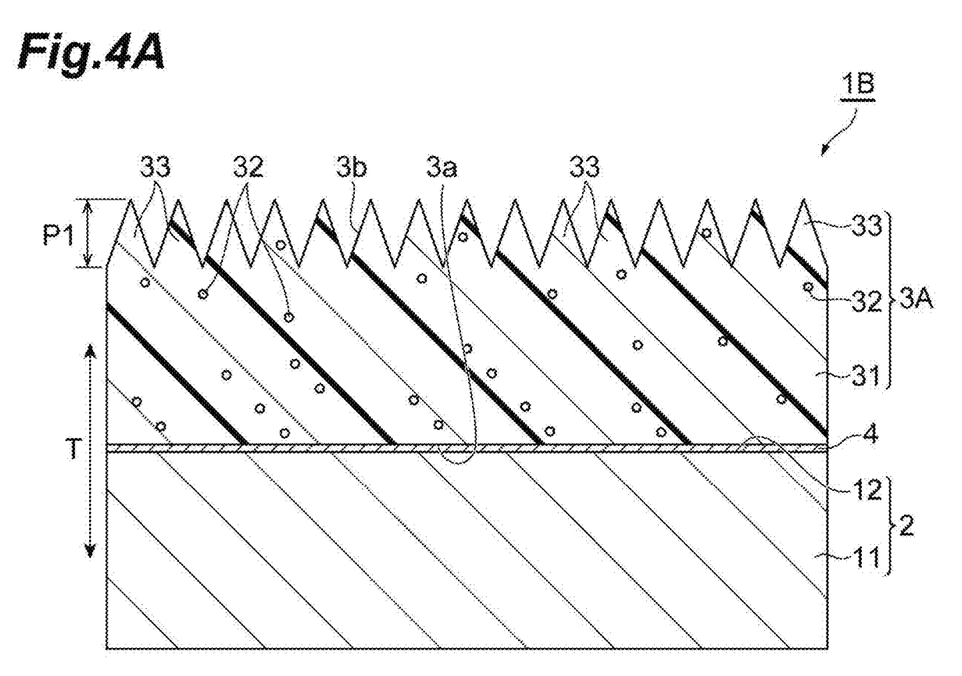
FIG. 4A shows a schematic cross section view of an optical element according to a second modification example.
Figure 4B:
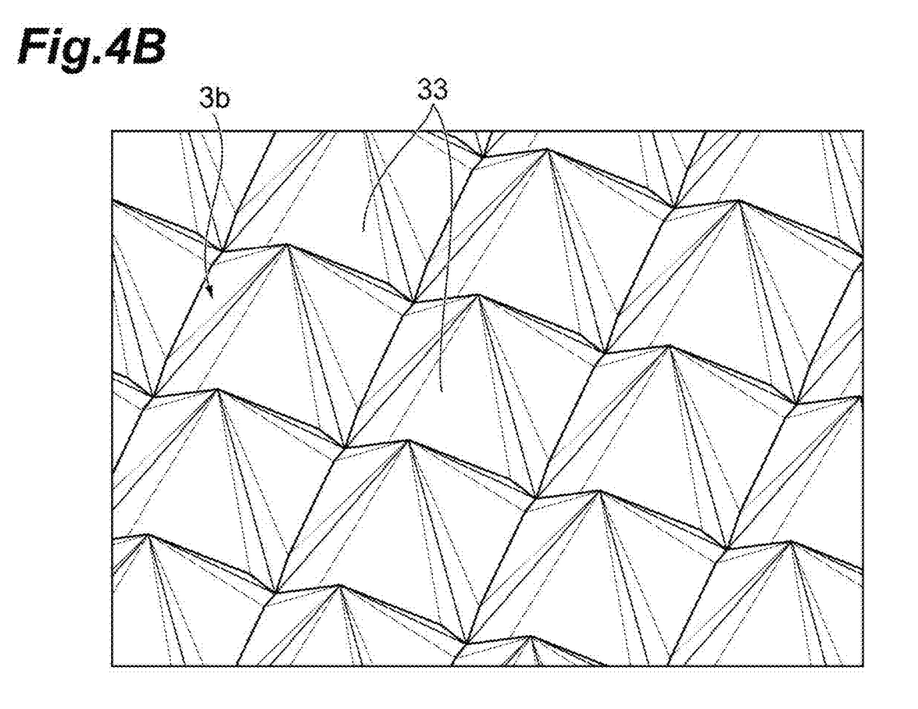
FIG. 4B shows an example of a surface of the optical element according to the second modification example.

FIG. 4A shows a schematic cross section view of an optical element according to a second modification example, and FIG. 4B shows an example of a surface of the optical element according to the second modification example. The second surface 3b of an antireflection film 3A of an optical element 1B shown in FIGS. 4A and 4B has an uneven shape. In the second modification example, in a case where the second surface 3b is rougher than the first surface 3a, the second surface 3b may be assumed to have an uneven shape. Alternatively, in a case of performing a step (for example, nanoimprint or etching) for providing unevenness on the second surface 3b, the second surface 3b may be assumed to have an uneven shape. Specifically, a plurality of protrusions 33 which are continuous along a plane direction of the second surface 3b are formed on the antireflection film 3A. Each protrusion 33 has an approximately quadrangular pyramid shape. A cross section including an apex of each protrusion 33 has a triangular shape. Each protrusion 33 is formed by, for example, nanoimprint.

In the second modification example described above, the same operation effect as that in the present embodiment is also exhibited. In addition, since the second surface 3b of the antireflection film 3A has a so-called moth-eye structure, it is possible to prevent the reflection of terahertz waves on the second surface 3b well.

Third Modification Example

Figure 5:
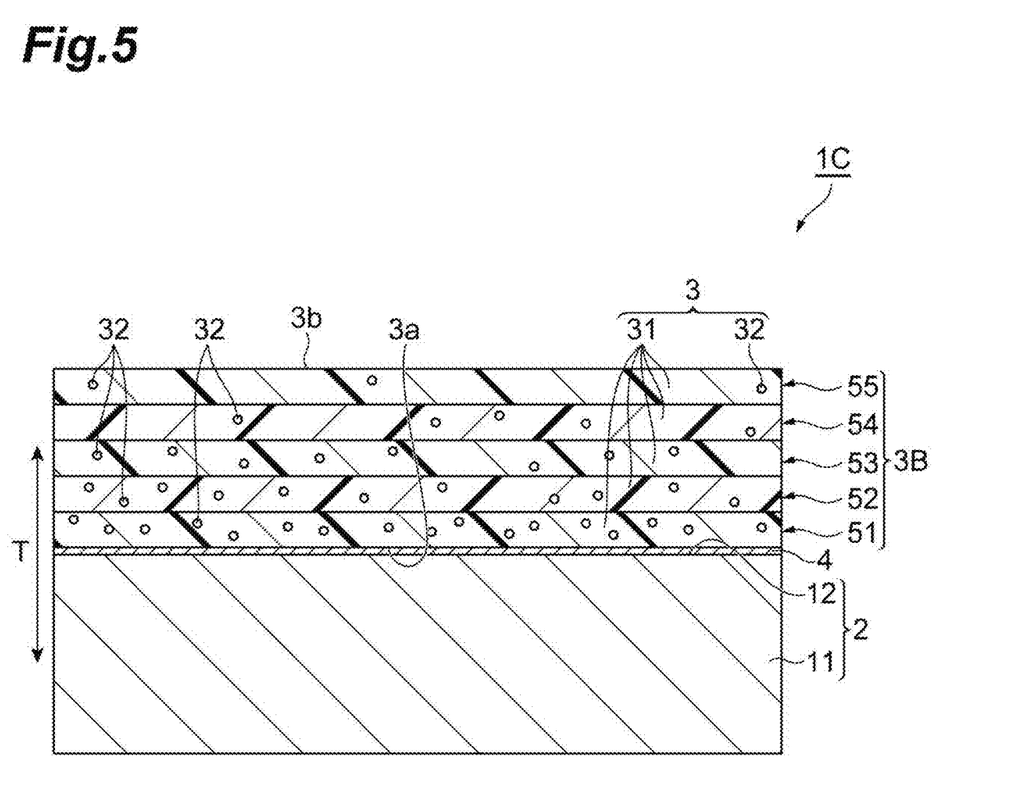
FIG. 5 shows a schematic cross section view of an optical element according to a third modification example.

FIG. 5 shows a schematic cross section view of an optical element according to a third modification example. An antireflection film 3B of an optical element 1C shown in FIG. 5 includes layers 51 to 55 stacked each other in the thickness direction T. In the third modification example, the layer 51 is most close to the optical component 2 in the thickness direction T, and the layer 55 is most separated from the optical component 2 in the thickness direction T. Each of the layers 51 to 55 includes an organic resin including a cycloolefin-based polymer as a main component, and the inorganic particles 32 dispersed in the organic resin. That is, each of the layers 51 to 55 includes the organic resin 31 having a layered shape and the inorganic particles 32.

In each of the layers 51 to 55, the higher a ratio of volume of the inorganic particles 32 per unit volume is, the closer to the optical component 2 is in the thickness direction T. Accordingly, a content of the inorganic particles 32 of the layer 51 is greatest and a content of the inorganic particles 32 of the layer 55 is smallest. That is, a refractive index is higher in the layer closer to the optical component 2 in the thickness direction T. A difference in refractive indexes of adjacent layers is preferably small. As the difference in refractive indexes of adjacent layers is small, it is possible to prevent reflection of terahertz waves on an interface between the adjacent layers, and terahertz waves can be transmitted through the antireflection film 3B well. Thicknesses of the layers 51 to 55 may be the same as each other or different from each other. Alternatively, thicknesses of some layers of the layers 51 to 55 may be different from the other layers. The antireflection film 3B is formed, for example, by forming the layers 51 to 55 in which the content of the inorganic particles 32 is adjusted, and laminating the layers 51 to 55 in order. Alternatively, the antireflection film 3B may be formed by applying the resin constituting the layers 51 to 55 onto the adhesive layer 4 in order.

In the third modification example described above, the same operation effect as that in the present embodiment is also exhibited. In addition, the ratio of the volume of the inorganic particles 32 occupying each of the layers 51 to 55 can be set. Therefore, it is possible to easily, reliably, and gradually change a refractive index of an antireflection film 3C in the thickness direction T.

Fourth Modification Example

Figure 6:
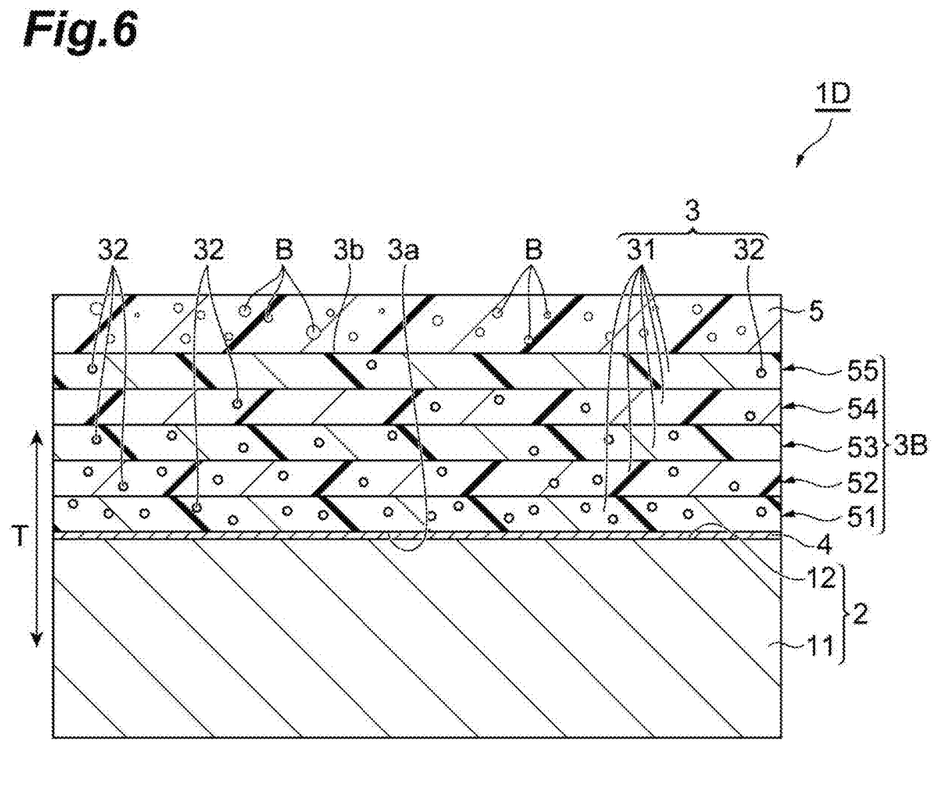
FIG. 6 shows a schematic cross section view of an optical element according to a fourth modification example.

FIG. 6 shows a schematic cross section view of an optical element according to a fourth modification example. An optical element 1D shown in FIG. 6 is obtained by adding the bubble-containing layer 5 shown in the first modification example to the optical element 1C shown in the third modification example. In such fourth modification example, the operation effect of the first modification example and the third modification example is exhibited.

Fifth Modification Example

Figure 7:
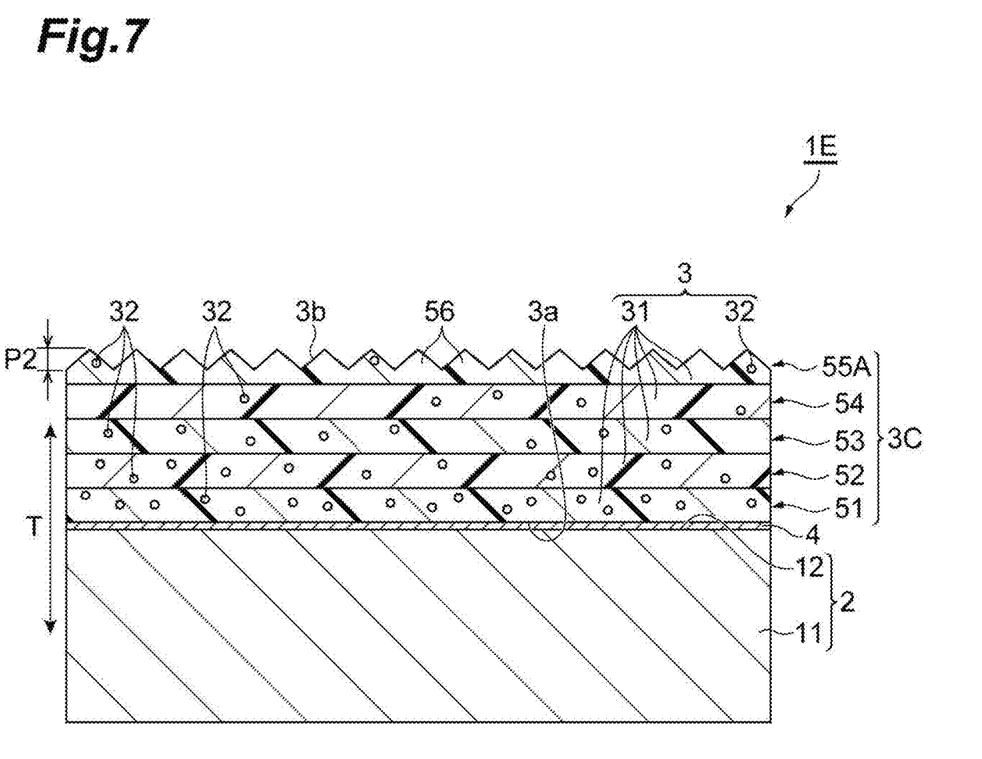
FIG. 7 shows a schematic cross section view of an optical element according to a fifth modification example.

FIG. 7 shows a schematic cross section view of an optical element according to a fifth modification example. The second surface 3b of the antireflection film 3C of an optical element 1E shown in FIG. 7 has an uneven shape, in the same manner as in the second modification example. Accordingly, a layer 55A which is included in the antireflection film 3C and most separated from the optical component 2 in the thickness direction T, includes a plurality of protrusions 56 which are continuous along a plane direction of the second surface 3b. Each protrusion 56 has an approximately quadrangular pyramid shape. A cross section including an apex of each protrusion 56 has a triangular shape. Each protrusion 56 is formed by, for example, nanoimprint.

In the fifth modification example described above, the same operation effect as that in the third modification example is also exhibited. In addition, since the second surface 3b of the antireflection film 3C has a so-called moth-eye structure, the same operation effect as that in the second modification example is also exhibited.

Hereinabove, the aspect of the present disclosure has been described in detail based on the embodiments and the modification examples. However, the aspect of the present disclosure is not limited to the embodiments and the modification examples. The aspect of the present disclosure can be further changed within a range not departing from the point thereof. In addition, the embodiments and the modification examples may be suitably combined. For example, the first and second modification examples may be combined and the surface of the bubble-containing layer may have an uneven shape. In this case, it is possible to prevent the reflection of terahertz waves on the surface of the bubble-containing layer well.

For example, in the embodiments and the first and second modification examples, the inorganic particles are un-uniformly dispersed in the antireflection film, but there is no limitation. The inorganic particles may be uniformly dispersed in the antireflection film. In this case, the antireflection film functions as an antireflection coating film which is a monolayer. Here, the refractive index of the antireflection film is set as $n_{flat}$, a thickness of the antireflection film is set as d, and a wavelength showing the maximum transmittance is set as $\lambda$. In this case, a relationship represented by [Formula 2] shown below is satisfied. m in [Formula 2] is an integer. The optical component is a silicon substrate, a refractive index thereof is set as $n_{si}$, and it is assumed that the antireflection film does not absorb terahertz waves at the wavelength. In a case where [Formula 3] shown below is satisfied under the assumption conditions, the antireflection film can show 100% of transmittance with respect to terahertz waves at the wavelength. Accordingly, in a case where the inorganic particles are uniformly dispersed in the antireflection film, the content of the inorganic particles may be adjusted to satisfy [Formula 3] shown below.

$$d = \frac{m\lambda}{4n_{flat}} \quad \text{[Formula 2]}$$

$$n_{flat} = \sqrt{n_{Si}} \quad \text{[Formula 3]}$$

In the embodiments and the modification examples, the adhesive layer has a single-layered structure, and there is no limitation thereto. The adhesive layer may have a multilayered structure. For example, the adhesive layer includes a first layer including a thermally denatured olefin-based polymer, and a second layer formed on the first layer. The second layer is a layer showing excellent adhesiveness with respect to the first layer and the antireflection film, and includes the thermally denatured olefin-based polymer. Accordingly, adhesiveness of the second layer with respect to silicon is smaller than adhesiveness of the first layer with respect to silicon. On the other hand, the adhesiveness of the second layer with respect to the antireflection film is greater than the adhesiveness of the first layer with respect to the antireflection film. Since the second layer shows adhesiveness, a degree of the thermal denaturing of the olefin-based polymer included in the second layer is smaller than a degree of the thermal denaturing of the olefin-based polymer included in the first layer. This degree of the thermal denaturing is adjusted by a heating temperature, a time, a surrounding atmosphere, and the like. For example, the heating temperature with respect to the first layer is 240° C.

to 320° C., and the heating temperature with respect to the second layer is equal to or higher than 160° C. and lower than 240° C. or higher than 320° C. and equal to or lower than 500° C. The adhesive layer may include a third layer, in addition to the first layer and the second layer. In this case, the adhesiveness of the first layer with respect to silicon is strongest. Meanwhile, the adhesiveness of the third layer with respect to antireflection film is strongest. For example, the heating temperature with respect to the first layer is 280° C. to 320° C., the with respect to the second layer is equal to or higher than 220° C. and lower than 280° C., and the with respect to the third layer is equal to or higher than 160° C. and lower than 220° C. or higher than 320° C. and equal to or lower than 500° C. In a case where the adhesive layer includes a first layer and a second layer, the antireflection film may be in contact with both of the first layer and the second layer. In a case where the adhesive layer includes a first layer, a second layer, and a third layer, the antireflection film may be in contact with all of the first layer, the second layer, and the third layer, or may be in contact with the second layer and the third layer.

In a case where the adhesive layer has a multilayered structure, a degree of the thermal denaturing of the olefin-based polymer included in each adhesive layer may be evaluated by the percentage of the oxygen content or infra-red absorption spectrum described above. For example, in a case of performing the evaluation based on the oxygen content, a difference between a degree of the thermal denaturing of the olefin-based polymer included in the first layer and a degree of the thermal denaturing of the olefin-based polymer included in the second layer is shown by a difference between a percentage of the number of oxygen atoms of the first layer with respect to a total of the number of oxygen atoms and the number of carbon atoms included in the first layer, and a percentage of the number of oxygen atoms of the second layer with respect to a total of the number of oxygen atoms and the number of carbon atoms included in the second layer. This difference is, for example, equal to or higher than 0.1%, equal to or higher than 0.2%, equal to or higher than 0.3%, equal to or higher than 0.4%, equal to or higher than 0.5%, equal to or higher than 0.8%, equal to or higher than 1.0%, equal to or higher than 2.0%, or equal to or higher than 3.0%. The difference is, for example, equal to or lower than 10.0%, equal to or lower than 7.0%, equal to or lower than 5.0%, equal to or lower than 3.0%, equal to or lower than 2.0%, equal to or lower than 1.0%, equal to or lower than 0.5%, equal to or lower than 0.3%, or equal to or lower than 0.1%. The difference may be 0.1% to 10.0%.

Alternatively, in a case of performing the evaluation based on the infrared absorption spectrum, the difference between the degree of the thermal denaturing of the olefin-based polymer included in the first layer and the degree of the thermal denaturing of the olefin-based polymer included in the second layer is shown by a difference between a ratio of an integrated value of an absorption peak of C=O stretching vibration of the first layer with respect to an integrated value of an absorption peak of C—H stretching vibration, and a ratio of an integrated value of an absorption peak of C=O stretching vibration of the second layer with respect to an integrated value of an absorption peak of C—H stretching vibration. The difference is, for example, equal to or greater than 0.1, equal to or greater than 0.2, equal to or greater than 0.3, equal to or greater than 0.4, equal to or greater than 0.5, equal to or greater than 0.8, equal to or greater than 1.0, equal to or greater than 2.0, or equal to or greater than 3.0. The difference may be, for example, equal to or smaller than 10.0, equal to or smaller than 7.0, equal to or smaller than 5.0, equal to or smaller than 3.0, equal to or smaller than 2.0, equal to or smaller than 1.0, equal to or smaller than 0.5, equal to or smaller than 0.3, or equal to or smaller than 0.1. The difference may be 0.1 to 20.0.

In the second modification example and the fourth modification example, each protrusion has an approximately quadrangular pyramid shape, but there is no limitation thereto. For example, each protrusion may have a polygonal pyramid shape or may have a cone shape. Each protrusion may have a semispherical shape or may have a polygonal pillar shape. Accordingly, each protrusion may have a polygonal cross section shape, may have an ellipse cross section shape, or may have a semicircular cross section shape. The plurality of protrusions are continuous along the plane direction of the second surface, but there is no limitation thereto. The adjacent protrusions may be separated from each other. That is, the second surface may include both of a region where the protrusion is provided, and a flat region in which the protrusion is not provided. Each protrusion may have a top face. That is, each protrusion may have a truncated cone shape or may have a multiple truncated pyramid shape.

In the third to fifth modification examples, the antireflection film includes five layers, but there is no limitation thereto. The antireflection film may include two or more layers. In the same manner, the number of layers included in the bubble-containing layer is not limited.

In the embodiments and the modification examples, the silicon substrate is not limited to a silicon wafer and may be a SOI substrate. In a case where the SOI substrate or the like is used, a main body portion is a silicon substrate, and a main surface may be a surface of a silicon layer provided on the silicon substrate through an insulating layer. That is, the main surface of the optical component may be a surface of a constituent element different from a constituent element of the main body portion.

In the embodiments and the modification examples, the antireflection film is directly bonded to the adhesive layer including the thermally denatured olefin-based polymer, but there is no limitation thereto. For example, an organic layer including a polymer not thermally denatured is provided between the adhesive layer including the thermally denatured olefin-based polymer, and the antireflection film, and the antireflection film may be bonded to the adhesive layer through the organic layer. The organic layer may be, for example, a part of the antireflection film. The polymer not thermally denatured is, for example, an olefin-based polymer.

EXAMPLES

The present disclosure will be described more specifically with reference to the following examples, but the present disclosure is not limited to these examples.

Example 1

First, 7 mass % of a cycloolefin polymer (manufactured by JSR Corporation, ARTON (registered trademark)) and 93 mass % of chloroform were mixed and stirred at room temperature, to obtain a solution. Then, the solution was spin-coated over a silicon substrate. In the spin coating, the silicon substrate to which the solution was added dropwise, was rotated at a rotation rate of 2000 rpm for 20 seconds. Then, the silicon substrate coated with the solution was maintained on a hot plate heated to 120° C. Accordingly, the solution was dried, and an adhesive layer (first adhesive layer) including an olefin-based polymer was formed on a surface of the silicon substrate. Then, the substrate formed with the adhesive layer was maintained on the hot plate heated to 280° C. for 1 minute. Accordingly, the silicon substrate provided with the thermally denatured adhesive layer was obtained. A thickness of the adhesive layer was 23 nm.

Then, the solution was spin-coated over the thermally denatured adhesive layer. In the spin coating, the silicon substrate to which the solution was added dropwise, was rotated at a rotation rate of 2000 rpm for 20 seconds. Then, the silicon substrate in which the solution was coated on the adhesive layer was maintained on a hot plate heated to 140° C. for 10 minutes. Accordingly, the solution was dried, and an organic resin layer including an olefin-based polymer was formed on the adhesive layer. A thickness of the organic resin layer was 23 nm.

Example 2

Unlike Formula 1, the adhesive layer has a double layer structure. Specifically, after forming the first adhesive layer, the solution was spin-coated. In the spin coating, the silicon substrate to which the solution was added dropwise, was rotated at a rotation rate of 2000 rpm for 20 seconds. Then, the silicon substrate in which the solution was coated on the first adhesive layer was maintained on a hot plate heated to 120° C. Accordingly, the solution was dried, and a second adhesive layer including an olefin-based polymer was formed on the first adhesive layer. Then, the substrate formed with the second adhesive layer was maintained on a hot plate heated to 200° C. for 1 minute. Accordingly, the silicon substrate provided with thermally denatured first and second adhesive layer was obtained. A thickness of the second adhesive layer was 23 nm. In Example 2, the organic resin layer was formed on the second adhesive layer.

Example 3

Unlike Examples 1 and 2, the adhesive layer has a three-layered structure. Specifically, first, the first adhesive layer and the second adhesive layer were formed. In Example 3, the first adhesive layer and the second adhesive layer were formed at a temperature different from that in Example 2. Specifically, in Example 3, a temperature in a case of performing the thermal denaturing of the first adhesive layer was set as 300° C., and a temperature in a case of performing the thermal denaturing of the second adhesive layer was set as 280° C. Then, the solution was spin-coated. In the spin coating, the silicon substrate to which the solution was added dropwise, was rotated at a rotation rate of 2000 rpm for 20 seconds. Then, the silicon substrate in which the solution was coated on the second adhesive layer was maintained on a hot plate heated to 120° C. Accordingly, the solution was dried, and a third adhesive layer including an olefin-based polymer was formed on the second adhesive layer. Then, the substrate formed with the third adhesive layer was maintained on the hot plate heated to 200° C. for 1 minute. Accordingly, the silicon substrate provided with the first to third adhesive layers which are thermally denatured was obtained. A thickness of the third adhesive layer was 23 nm. In Example 3, the organic resin layer was formed on the third adhesive layer.

Example 4

Unlike Examples 1 to 3, a film formed in advance was used as the adhesive layer. Specifically, first, a polyethylene film having a thickness of 30 μm was disposed on a silicon substrate. Then, the silicon substrate was heated at 120° C. for 1 minute. Accordingly, the silicon substrate provided with the first adhesive layer including an olefin-based polymer was obtained. Then, the silicon substrate was maintained on the hot plate heated to 280° C. for 1 minute. Accordingly, the silicon substrate provided with the thermally denatured first adhesive layer was obtained. Then, a polyethylene film having a thickness of 30 μm was disposed on the thermally denatured first adhesive layer. Then, the silicon substrate was heated at 120° C. for 1 minute. Accordingly, the second adhesive layer including an olefin-based polymer was formed on the thermally denatured first adhesive layer. Then, the silicon substrate was maintained on the hot plate heated to 200° C. for 2 minutes. Accordingly, the silicon substrate provided with the thermally denatured first and second adhesive layers was obtained.

Next, a polyethylene film having a thickness of 30 μm was disposed on the thermally denatured second adhesive layer. Then, the silicon substrate was heated at 120° C. for 1 minute. In addition, the silicon substrate was heated at 140° C. for 10 minutes. Accordingly, the organic resin layer including an olefin-based polymer was formed on the second adhesive layer.

Comparative Example 1

Unlike Examples 1 to 3, the organic resin layer including an olefin-based polymer was formed on the silicon substrate using the solution, without forming the first adhesive layer and the second adhesive layer. The organic resin layer is directly in contact with the surface of the silicon substrate.

Comparative Example 2

Unlike Example 4, the polyethylene film was disposed on the silicon substrate, without forming the first adhesive layer and the second adhesive layer. After heating the silicon substrate at 120° C. for 1 minute, the silicon substrate was heated at 140° C. for 10 minutes. Accordingly, in the same manner as in Comparative Example 1, the organic resin layer including an olefin-based polymer directly in contact with the silicon substrate was formed.

(Cross-Cut Test)

Cuts which are reached to the silicon substrate at interval of 1 mm were provided on an organic layer (each adhesive layer and organic resin layer) formed on the silicon substrate using a cutter knife. After providing six cuts, six cuts orthogonal to the cuts described above were provided on the organic layer. Accordingly, lattice-shaped cuts were provided on the organic layer. Next, Scotch (registered trademark)/Mending tape 810 (manufactured by 3M Company, width: 24 mm, length: 50 mm) was bonded to the surface of the organic layer, and the tape was rubbed with finger against the organic layer. Then, the tape was peeled off. A region where the bonding and the peeling of the tape were performed, was observed with a stereoscopic microscope.

The evaluation result of the cross-cut test was classified as follows.

A: Edge of the cut was completely soft and peeling was not recognized from any lattice.

B: Peeling has occurred at a part of the organic layer, but a percentage of the affected cross-cut portion was smaller than 35%.

C: Peeling has occurred over the entire surface of the organic layer, and a percentage of the affected cross-cut portion was equal to or greater than 35%.

The evaluation result of the cross-cut test in Examples 1 and 4 was B, and the evaluation result in Examples 2 and 3 was λ. Meanwhile, the evaluation result in Comparative Examples 1 and 2 was C. From these results, it was found that, by providing the thermally denatured adhesive layer, the bonding of the silicon substrate and the organic resin layer including an olefin-based polymer was strengthened.

Reference Examples 1 to 6

In the same manner as in Example 1, the silicon substrate provided with the thermally denatured adhesive layer was formed. In Reference Examples 1 to 6, a solution obtained by mixing and stirring 20 mass % of a cycloolefin polymer (manufactured by JSR Corporation, ARTON (registered trademark)) and 80 mass % of chloroform were mixed and stirred at room temperature was used. In addition, in Reference Examples 1 to 6, the silicon substrate coated with the solution was maintained on the hot plate set at different temperatures for 1 minute. The temperatures of the hot plate in Reference Examples 1 to 6 were as shown in Table 1.

Elemental Analysis Due to XPS

With respect to each of Reference Examples 2 to 5, a percentage of the number of oxygen atoms included in the adhesive layer with respect to a total of the number of oxygen atoms and the number of carbon atoms included in the adhesive layer (number of oxygen atoms/(number of oxygen atoms+number of carbon atoms)×100(%)) was obtained by using "K-Alpha (Thermo Fisher Scientific K.K.)". These evaluation results are as shown in Table 1.

(Infrared Absorption Spectrum Measurement)

With respect to each of Reference Examples 1 to 6, the infrared absorption spectrum of the adhesive layer was measured by using "Nicolet 6700" (Thermo Fisher Scientific K.K.)". A ratio of an integrated value of an absorption peak of C=O stretching vibration shown at 1732 $cm^{-1}$ with respect to an integrated value of an absorption peak of C—H stretching vibration shown at 2947 $cm^{-1}$ (integrated value of absorption peak of C=O stretching vibration/integrated value of absorption peak of C—H stretching vibration (dimensionless number)) was obtained. These evaluation results are as shown in Table 1.

TABLE 1

|  | Temperature of hot plate (° C.) | Number of O atoms/ (number of O atoms + number of C atoms) (%) | Ratio of integrated value (—) |
|---|---|---|---|
| Reference Example | 400 | — | 3.1 |
| Reference Example 2 | 320 | 7.1 | 0.25 |
| Reference Example 3 | 280 | 6.3 | 0.22 |
| Reference Example 4 | 240 | 0.1 | 0 |
| Reference Example 5 | 200 | 0.1 | 0 |
| Reference Example 6 | 160 | — | 0 |

As shown in Table 1, as the temperature of the hot plate decreases, the percentage of the number of oxygen atoms included in the adhesive layer with respect to a total of the number of oxygen atoms and the number of carbon atoms included in the adhesive layer decreases. As the temperature of the hot plate decreases, the ratio of the integrated value of the absorption peak of C=O stretching vibration with respect to the integrated value of the absorption peak of C—H stretching vibration decreases. From these results, each of the percentage of the number of oxygen atoms included in the adhesive layer with respect to a total of the number of oxygen atoms and the number of carbon atoms included in the adhesive layer, and the ratio of the integrated value of the absorption peak of C=O stretching vibration with respect to the integrated value of the absorption peak of C—H stretching vibration is understood to be usable as an index of the degree of the thermal denaturing of the olefin-based polymer included in the adhesive layer.

What is claimed is:

1. An optical element for terahertz waves, comprising:
   an optical component including a silicon surface;
   an antireflection film including an organic resin including a cycloolefin-based polymer as a main component, and inorganic particles dispersed in the organic resin; and
   an adhesive layer located between the optical component and the antireflection film in a thickness direction of the antireflection film, the adhesive layer bonding the silicon surface of the optical component and the antireflection film to each other,
   wherein the adhesive layer includes a thermally denatured olefin-based polymer, and
   wherein a percentage of the number of oxygen atoms included in the thermally denatured polymer with respect to a total of the number of oxygen atoms and the number of carbon atoms included in the thermally denatured polymer is equal to or higher than 0.3%.

2. The optical element for terahertz waves according to claim 1, wherein a ratio of a volume of the inorganic particles per unit volume of the antireflection film become higher, the closer it is to the optical component in the thickness direction.

3. The optical element for terahertz waves according to claim 1, wherein
   the antireflection film includes a plurality of layers stacked each other in the thickness direction,
   each of the plurality of layers includes the organic resin including the cycloolefin-based polymer as a main component, and
   the inorganic particles dispersed in the organic resin, and
   a ratio of a volume of the inorganic particles per unit volume becomes higher at the layers closer to the optical component in the thickness direction.

4. The optical element for terahertz waves according to claim 1, wherein
   the antireflection film includes a first surface facing the optical component in the thickness direction and a second surface located opposite to the first surface, and
   the optical element for terahertz waves further includes a bubble-containing layer located on the second surface and including a plurality of bubbles.

5. The optical element for terahertz waves according to claim 4, wherein a surface of the bubble-containing layer has an uneven shape.

6. The optical element for terahertz waves according to claim 1, wherein
   the antireflection film includes a first surface facing the optical component in the thickness direction and a second surface located opposite to the first surface, and
   the second surface has an uneven shape.

7. The optical element for terahertz waves according to claim 1, wherein a thickness of the adhesive layer is 1 nm to 100 μm.

8. The optical element for terahertz waves according to claim 1, wherein the inorganic particles includes at least one of silicon particles, titanium oxide particles and diamond particles.

9. An optical element for terahertz waves, comprising:
an optical component;
an antireflection film including an organic resin including a cycloolefin-based polymer as a main component, and inorganic particles dispersed in the organic resin; and
an adhesive layer located between the optical component and the antireflection film in a thickness direction of the antireflection film, the adhesive layer bonding a surface of the optical component and the antireflection film to each other,
wherein the adhesive layer includes a thermally denatured olefin-based polymer, and
wherein a percentage of the number of oxygen atoms included in the thermally denatured polymer with respect to a total of the number of oxygen atoms and the number of carbon atoms included in the thermally denatured polymer is equal to or higher than 0.3%.

10. The optical element for terahertz waves according to claim 9, wherein a ratio of a volume of the inorganic particles per unit volume of the antireflection film become higher, the closer it is to the optical component in the thickness direction.

11. The optical element for terahertz waves according to claim 9, wherein
the antireflection film includes a plurality of layers stacked each other in the thickness direction,
each of the plurality of layers includes the organic resin including the cycloolefin-based polymer as a main component, and
the inorganic particles dispersed in the organic resin, and
a ratio of a volume of the inorganic particles per unit volume becomes higher at the layers closer to the optical component in the thickness direction.

12. The optical element for terahertz waves according to claim 9, wherein
the antireflection film includes a first surface facing the optical component in the thickness direction and a second surface located opposite to the first surface, and
the optical element for terahertz waves further includes a bubble-containing layer located on the second surface and including a plurality of bubbles.

13. The optical element for terahertz waves according to claim 12, wherein a surface of the bubble-containing layer has an uneven shape.

14. The optical element for terahertz waves according to claim 9, wherein
the antireflection film includes a first surface facing the optical component in the thickness direction and a second surface located opposite to the first surface, and
the second surface has an uneven shape.

15. The optical element for terahertz waves according to claim 9, wherein a thickness of the adhesive layer is 1 nm to 100 μm.

16. The optical element for terahertz waves according to claim 9, wherein the inorganic particles includes at least one of silicon particles, titanium oxide particles and diamond particles.

17. The optical element for terahertz waves according to claim 9, wherein the surface of the optical component includes or is a silicon surface.

* * * * *